United States Patent
Savvides et al.

(10) Patent No.: US 12,266,156 B2
(45) Date of Patent: Apr. 1, 2025

(54) SYSTEM AND METHOD FOR SOLVING MISSING ANNOTATION OBJECT DETECTION

(71) Applicant: CARNEGIE MELLON UNIVERSITY, Pittsburgh, PA (US)

(72) Inventors: Marios Savvides, Wexford, PA (US); Zhiqiang Shen, Pittsburgh, PA (US); Fangyi Chen, Pittsburgh, PA (US); Han Zhang, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 457 days.

(21) Appl. No.: 17/670,737

(22) Filed: Feb. 14, 2022

(65) Prior Publication Data

US 2022/0262101 A1    Aug. 18, 2022

Related U.S. Application Data

(60) Provisional application No. 63/149,412, filed on Feb. 15, 2021.

(51) Int. Cl.
*G06V 10/774*    (2022.01)

(52) U.S. Cl.
CPC ................... *G06V 10/774* (2022.01)

(58) Field of Classification Search
CPC .................................... G06V 10/774
See application file for complete search history.

(56) References Cited

U.S. PATENT DOCUMENTS

| | | | | |
|---|---|---|---|---|
| 2019/0251398 A1* | 8/2019 | Godwin, IV | .......... | G06F 18/217 |
| 2021/0150275 A1* | 5/2021 | Schulter | ............... | G06V 20/58 |
| 2021/0319340 A1* | 10/2021 | Shabtay | ................. | G06N 5/04 |
| 2022/0383621 A1* | 12/2022 | Patil | ....................... | G06N 3/08 |
| 2023/0274527 A1* | 8/2023 | Chen | ................... | G06F 18/214 |
| | | | | 382/181 |

OTHER PUBLICATIONS

Zhang et al., "Solving Missing-Annotation Detection with Background Recalibration Loss", arXiv:2002.05274v1 [cs.CV], Feb. 12, 2020, pp. 1-5 (Year: 2020).*

Li et al., "Learning from Noisy Anchors for One-stage Object Detection", 2020 IEEE/CVF Conference on Computer Vision and Patter Recognition (CVPR), pp. 10585-10594 (Year: 2020).*

* cited by examiner

*Primary Examiner* — Ping Y Hsieh
*Assistant Examiner* — Jose M Torres
(74) *Attorney, Agent, or Firm* — KDW Firm PLLC

(57) ABSTRACT

Disclosed herein is a system and method for improving the accuracy of an object detector when trained with a dataset having a significant number of missing annotations. The method uses a novel Background Recalibration Loss (BRL) which adjusts the gradient direction according to its own activation to reduce the adverse effect of error signals by replacing the negative branch of the focal loss with a mirror of the positive branch when the activation is below a confusion threshold.

9 Claims, 2 Drawing Sheets

SYSTEM AND METHOD FOR SOLVING MISSING ANNOTATION OBJECT DETECTION

RELATED APPLICATIONS

This application claims the benefit of U.S. Provisional Patent Application No. 63/149,412, filed Feb. 15, 2021, the contents of which are incorporated herein in their entirety.

BACKGROUND

Generic object detection using machine learning models has always faced the challenge of data annotation quality. In some instances, only a portion of instances of objects in a training dataset are well annotated and a large portion of true objects are missed. This is common when the size of a collected dataset becomes larger and larger. A good example of this is the OpenImages V4 dataset, containing ~9.2M images and ~15.4M bounding boxes across ~600 object classes. On such a large dataset, it may be impossible, in practice, to annotate every existing object in each image.

The major challenge with a dataset having a large number of objects without annotation is that a model trained on such a dataset may suffer from incorrect supervision signals due to objects missing annotations. Thus, the unlabeled object areas are treated as background and tend to confuse the model during training.

One straight-forward way to account for the incompleteness of annotations is to use another trained detector trained with a well-annotated dataset (such as MS COCO) to detect the presence of the amphibolous objects. The fatal drawback in this solution is that the label distributions (i.e., classes) in diverse datasets are usually different. For example, PASCAL VOC has 20 classes, MS COCO has 80 classes and OpenImage V4 has 600 classes). Therefore, it is difficult, or even unpractical, to directly transfer detectors from one dataset to another.

A variety of two-stage detector based methods to address the missing-annotation problem have been proposed, such as part-aware sampling and soft sampling. Two-stage detectors are naturally more robust than one-stage detectors for the missing-annotation circumstance. This advantage originates from the training strategy. One common practice for training two-stage detectors is to randomly sample a balanced batch of positive and negative examples during each iteration. Due to the great population of negative anchors, the model is hardly affected by the limited propagation of errors in most sampling cases. This is the reason that most of the previous solutions are built on two-stage detectors.

However, two-stage detectors have some intrinsic drawbacks such as: (1) they are usually slower than one-stage detectors because two-stage detectors require large-resolution input size to maintain the high performance; 2) it is complicated to adjust the hyper-parameters and the detector is not flexible to different datasets; and (3) in some extreme cases of missing labels, the benefits from random sampling will still reach its limits.

Unlike two-stage detectors, the common practice for training anchor-based single-stage detectors is to use either hard example mining or to not use sampling at all. The model thus can be trained with all the anchors at once with huge class imbalance and it will still achieve high performance. Nevertheless, the problem becomes difficult when the majority of the annotations are missing.

Thus, it would be desirable to make single-stage detectors more robust such that they can take advantage of their faster speed and while still having the accuracy advantages of the two-stage detectors and, at the same time, be more tolerant to difficult data.

SUMMARY

To make the idea of using single-stage detectors applicable, disclosed herein are approaches to filter out error signals and correct them if possible. The invention includes a system and method implementing a novel solution to this problem, referred to herein as "Background Recalibration Loss" (BRL) that automatically re-calibrates loss signals according to a pre-defined IoU threshold and input image. The method is built on a one-stage detector which is faster and lighter.

BRIEF DESCRIPTION OF THE DRAWINGS

By way of example, a specific exemplary embodiment of the disclosed system and method will now be described, with reference to the accompanying drawings, in which.

DETAILED DESCRIPTION

Figure 1:
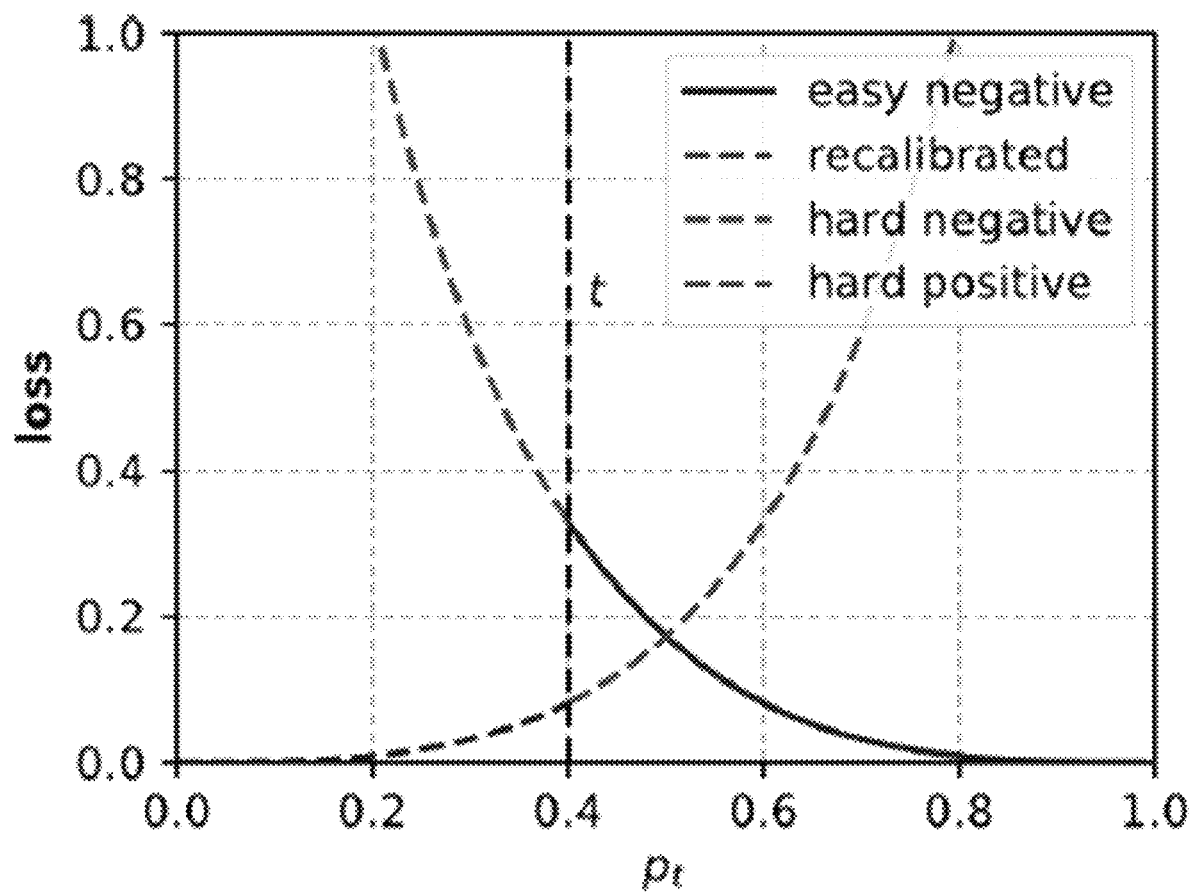
FIG. 1 is a graph showing the loss applied using BRL.

Single stage detectors often depend on a dense coverage of anchors on image feature maps. While the dense coverage ensures sufficient training samples, it naturally introduces massive class imbalances. Focal Loss is widely favored among single stage detectors as it effectively re-scales the gradients of the anchors. In general, it calibrates and re-scales the gradients for both hard and easy training examples. However, any outlier will also spike the gradients as they are usually hard examples. In the case of missing labels, the missing annotation examples are a type of hard negative example because of their feature-level resemblance to the positive ones.

One quick solution is to use an Intersection over Union (IoU) threshold by taking into account only the anchors with sufficient IoU values with the existing ground truth bounding boxes. Any other anchors are marked as confusion anchors and ignored during training. This raises the problem that the background information is lost during this brute-force mining. Despite the fact that most of the confusion anchors can be extracted using the IoU threshold, it is difficult to isolate them from the large pool of true-negative backgrounds. In the missing label cases, however, anchors with 0 IoU values with ground-truth anchors can still be positive targets. This creates a problem in that some positive anchor boxes are mixed with the largely available negative anchor boxes (See FIG. 2, 202) and the traditional focal loss is therefore unable to learn from the wrong signals.

Therefore, disclosed herein is a novel loss function, referred to as the Background Recalibration Loss (BRL), which adjusts the gradient direction according to its own activation to reduce the adverse effect of error signals. BRL is based on the focal loss, which is given by:

$$FL(p_t) = -\alpha_t(1-p_t)^\gamma \log(p_t) \qquad (1)$$

where:

$p_t \in [0,1]$ represents the predicted confidence score of an anchor, that is, the confidence that the anchor is a ground-truth anchor;

γ controls the shape of the curve. The higher the value of γ, the lower the loss will be for well-classified examples, such that more attention is given to the hard-to-classify examples. Having higher γ extends the range in which an example receives low loss (when γ=0, the focal loss is equivalent to the cross-entropy loss); and $\alpha_t$ is a scaling factor that gives a high weight to rare classes and a small weight to dominating or common classes.

$p_t$ measures the confidence scores of both foreground and background predictions. First, the detector will generate a scalar value (p), which is the confidence score for a predicted foreground object. When there is actually a foreground object, the ground truth label is 1, and $p_t$=p. But when there isn't any object, the ground truth label is 0, and $p_t$=(1−p). During training, the score $p_t$ is tested against both the foreground and background cases. As an example, assume a confidence score for a predicted bounding box as being "human" with a score p=0.7. This indicates that the model has a confidence score of (1−p)=(1−0.7)=0.3 that the bounding box is not a human.

For the task at hand, the branch of the focal loss for the negative samples is of the most interest. The meaning of $p_t$ is straightforward. The greater the value, the higher the probability that the anchor is predicted as negative. $p_t$ measures both the positive and negative cases. Here, the $p_t$ for negative samples is actually (1−p), so a higher score means a lower score for p. The anchors associated with missing annotations would have lower activation as negative examples and would generate huge gradients if $p_t$ is close to 0.

Directly ignoring these hard negative samples appears to be a good solution but improvement can be realized by providing a better gradient control method through the recalibration of the hard negative samples. The negative branch of the focal loss is replaced with the mirrored positive branch when $p_t$ is below some confusion threshold t, as given by:

$$BRL(p_t) = \begin{cases} -\alpha_t(1-p_t)^\gamma \log(p_t), & p_t > t \\ -\alpha_t p_t^\gamma (1-p_t), & \text{otherwise} \end{cases} \quad (2)$$

It should be noted that, in the case of t=0, the BRL is equivalent to the focal loss.

Intuitively, when the prediction $p_t$ for negative samples is of low confidence, the training data cannot be trusted, and the negative samples are treated as positives. As example is shown in FIG. 1, wherein the loss function plot for positive/negative samples are mirrored, this is because $p_t$=(1−p) for the negative samples.

Ambiguous anchors are first identified by ranking the IoU values of all anchors. Typically, most anchors have a near 0 IoU with any ground-truth anchors. The BRL module bootstraps information from the model itself to correct the learning signals. Specifically, the positive branch of the focal loss is partially copied (i.e., mirrored) to replace the negative branch of the focal loss when $p_t$ is below the confusion threshold. When the model is initialized, the classification training is purely dependent on the data available. However, after a number of iterations, a model trained with ambiguous data will have some prediction scores (above some threshold value) on the missed annotations. In this case, the loss function reverses the training signal and tells the model to trust its own predictions rather than the wrong labels (i.e., the missed annotations). This bootstraps the model.

Note that the anchors are divided into positive/negative/ambiguous anchors. The loss function works in both directions. When there is a foreground object, the loss function forces the prediction score p to be higher for that class, and, as a result, (1−p) is forced to be lower. This is measured as cross entropy loss −[γ log(p)+(1−γ)log(1−p)]. γ is the ground truth label. For ambiguous cases, γ=0, same as the background class. The first term is the positive branch of the loss function and is now 0, the second term is the negative branch. if training proceeded normally, it means that the missed annotations are trusted as being real background. But if the annotations are not trusted, the positive branch is copied and the label is set such that γ=1.

Figure 2:
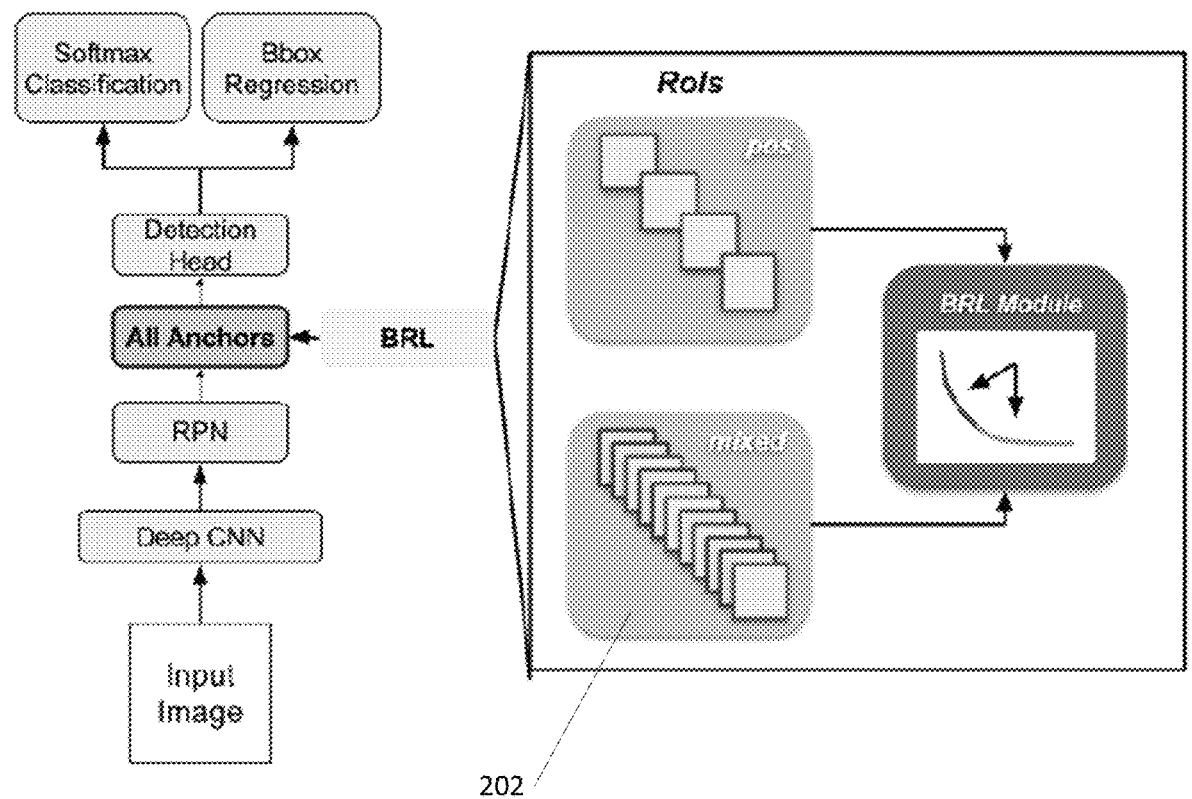
FIG. 2 is a block diagram showing the relation of BRL to the rest of the training pipeline.

FIG. 1 is a graph showing the loss applied using BRL for easy negatives and easy and hard positives. Positive anchors are target anchors or foreground information such as ground-truths, while negative anchors are non-target anchors or background information, such as an anchor whose IoU with ground-truths is less than a given threshold. Easy positives/negatives are anchors classified as positive/negative examples, while hard positives/negatives are anchors that are misclassified as negative/positive examples. FIG. 2 is a block diagram showing the application of the BRL for all anchors in the training pipeline.

The motivation of using the mirrored focal loss is directly related to the task. Generally, hard negative examples are the exact counterparts of easy positive examples in terms of their feature level representations. Despite the lack of correct labels, the model can adjust the gradients according to its own well established classifier. Specifically, if the feature map of an anchor region is similar to that of a ground-truth object, the classifier naturally assigns a low confidence score $p_t$. If the classifier is sufficiently trained, the model can be trusted more with itself instead of the annotations. In this manner, the model will actually learn as if the anchor is positively labeled.

The novel concept of a Background Recalibration Loss has been disclosed herein. BRL is a loss function that is more fit for missing-labeled object detection scenario and which vastly improves the detection performance of model trained using it.

As would be realized by one of skill in the art, the methods described herein can be implemented on a system comprising a processor and memory, storing software that, when executed by the processor, implements the described methods.

As would further be realized by one of skill in the art, many variations on implementations discussed herein which fall within the scope of the invention are possible. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims which follow.

The invention claimed is:

1. A method comprising:
   exposing an object detection model to an input training image;
   identifying one or more anchors on the image;
   for each anchor:
   determining a predicted confidence that the anchor is a ground-truth anchor;
   applying a focal loss when the confidence is above a predetermined confusion threshold;
   applying a mirror of the focal loss when the confidence is below the confusion threshold; and
   generating a scaler value p as a confidence score for the anchor when the anchor has a predicted foreground object.

2. The method of claim 1 wherein the mirror of the focal loss in given by:

$$-\alpha_t p_t^{\gamma}(1-p_t)$$

where:
   $p_t$ is the predicted confidence that the anchor is a ground-truth anchor;
   $\gamma$ controls the loss for well-classified anchor boxes; and
   $\alpha_t$ is a scaling factor.

3. The method of claim 2 wherein $p_t$ indicates a confidence score for both positive and negative anchors.

4. The method of claim 3 wherein the anchor is a foreground object and further wherein $p_t=p$.

5. The method of claim 4 wherein the anchor is not a foreground object and further wherein $p_t=(1-p)$.

6. The method of claim 1 wherein applying the mirror of the focal loss comprises treating negative samples as positive samples when a confidence score for the negative sample is low.

7. The method of claim 1 wherein the predicted confidence is based on an intersection over union between the anchor and a ground-truth bounding box.

8. A system comprising:
   a processor; and
   software that, when executed by the processor, performs the steps of the method of claim 1.

9. A system comprising:
   a processor; and
   software that, when executed by the processor, performs the steps of the method of claim 5.

* * * * *